(12) United States Patent
Tan et al.

(10) Patent No.: US 11,625,945 B2
(45) Date of Patent: Apr. 11, 2023

(54) FINGERPRINT SENSOR HOUSING WITH NON-UNIFORM THICKNESS

(71) Applicant: Synaptics Incorporated, San Jose, CA (US)

(72) Inventors: Yeh-Cheng Tan, Fremont, CA (US); Shengmin Wen, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 121 days.

(21) Appl. No.: 16/909,789

(22) Filed: Jun. 23, 2020

(65) Prior Publication Data

US 2021/0397809 A1   Dec. 23, 2021

(51) Int. Cl.
*G06V 40/13* (2022.01)
*H01L 51/52* (2006.01)

(52) U.S. Cl.
CPC ...... *G06V 40/1329* (2022.01); *G06V 40/1306* (2022.01); *H01L 51/5246* (2013.01); *H01L 51/5256* (2013.01)

(58) Field of Classification Search
CPC .............. G06K 9/00053; G06K 9/0002; H01L 51/5246; H01L 51/5256; G06V 40/1329; G06V 40/1306
See application file for complete search history.

(56) References Cited

U.S. PATENT DOCUMENTS

| | | | | |
|---|---|---|---|---|
| 2017/0005707 | A1* | 1/2017 | Islam | H01Q 1/243 |
| 2017/0061193 | A1* | 3/2017 | Young | G06K 9/0002 |
| 2017/0357842 | A1* | 12/2017 | Park | C03C 17/23 |
| 2017/0372112 | A1* | 12/2017 | Baker | G06V 40/1329 |
| 2018/0327255 | A1* | 11/2018 | Endean | B81C 1/0019 |
| 2019/0204969 | A1* | 7/2019 | Jo | G06F 3/0443 |
| 2020/0189908 | A1* | 6/2020 | Dangelmaier | B81B 7/0061 |
| 2020/0348790 | A1* | 11/2020 | Vampola | G09G 3/3406 |
| 2021/0019487 | A1* | 1/2021 | Chau | G06K 9/0002 |

* cited by examiner

*Primary Examiner* — Premal R Patel
(74) *Attorney, Agent, or Firm* — Paradice & Li LLP

(57) ABSTRACT

A sensor assembly includes a cover layer and a first sensor apparatus. The cover layer is molded from a first material to have a planar surface and non-uniform thickness, where a thickness of the first material at a first region of the cover layer is less than a thickness of the first material surrounding the first region. The first sensor apparatus is disposed beneath the planar surface of the cover layer, within the first region. The first sensor apparatus is configured to transmit and receive first capacitive sensing signals through a portion of the planar surface coinciding with the first region. For example, the first sensor apparatus may be a fingerprint sensor configured to detect a fingerprint on the portion of the planar surface coinciding with the first region based on changes in the first capacitive sensing signals.

19 Claims, 11 Drawing Sheets

FINGERPRINT SENSOR HOUSING WITH NON-UNIFORM THICKNESS

TECHNICAL FIELD

The present implementations relate generally to fingerprint sensors, and specifically to fingerprint sensor housings with non-uniform thickness.

BACKGROUND OF RELATED ART

Authentication is a mechanism for verifying the identity of a user attempting to access a device and/or application. A basic form of authentication may require a user to input a username and password via an input device. However, usernames and passwords are easily stolen and can be used by unauthorized users to gain access to a corresponding device or application. Thus, modern authentication schemes increasingly rely on biometric sensors (e.g., sensors capable of identifying unique biological characteristics of the user) to provide greater levels of security. Example biometric sensors include fingerprint scanners, facial recognition systems, eye scanners, voice recognition systems, and the like. Biometric inputs typically require the user to physically interact with one or more sensors to perform authentication.

Some fingerprint scanners may use capacitive imaging techniques to capture details of a user's fingerprint. For example, the fingerprint scanner may include an array of capacitive sensing elements (e.g., sensor electrodes) that are used to measure changes in the capacitance or electric field on a fingerprint sensing surface resulting from a finger interacting with the surface. More specifically, the amount of charge accumulated on the capacitive sensing elements may be correlated to the ridges and valleys in the user's fingertip. To ensure the high levels of detail and accuracy in capacitive measurements needed for fingerprint authentication, the fingerprint sensing surface is often formed by placing a very thin sheet of cover material (such as glass) over the capacitive sensing elements. However, such cover sheets are fragile, expensive to manufacture, and offer limited customizability.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a sensor assembly including a cover layer and a first sensor apparatus. The cover layer is molded from a first material to have a planar surface and non-uniform thickness, where a thickness of the first material at a first region of the cover layer is less than a thickness of the first material surrounding the first region. The first sensor apparatus is disposed beneath the planar surface of the cover layer, within the first region, and configured to transmit and receive first capacitive sensing signals through a portion of the planar surface coinciding with the first region.

Another innovative aspect of the subject matter of this disclosure can be implemented in a method of manufacturing a sensor assembly. The method includes steps of molding a first material to form a cover layer having a planar surface and non-uniform thickness, where a thickness of the first material at a first region of the cover layer is less than a thickness of the first material surrounding the first region; and disposing a first sensor apparatus beneath the planar surface of the cover layer, within the first region, where the first sensor apparatus is configured to transmit and receive first capacitive sensing signals through a portion of the planar surface coinciding with the first region.

Another innovative aspect of the subject matter of this disclosure can be implemented in a sensory assembly including a cover layer, a fingerprint sensor, and a proximity sensor. The cover layer is molded from a first material to have a planar surface and non-uniform thickness, where a thickness of the first material at a first region of the cover layer is less than a thickness of the first material surrounding the first region. The fingerprint sensor is disposed beneath the planar surface of the cover layer, within the first region, and configured to detect a fingerprint on a portion of the planar surface coinciding with the first region. The proximity sensor is disposed beneath the planar surface of the cover layer, in a second region surrounding the first region, and configured to detect a position of an input object relative to a portion of the planar surface coinciding with the second region.

BRIEF DESCRIPTION OF THE DRAWINGS

The present implementations are illustrated by way of example and are not intended to be limited by the figures of the accompanying drawings.

DETAILED DESCRIPTION

Figure 1:
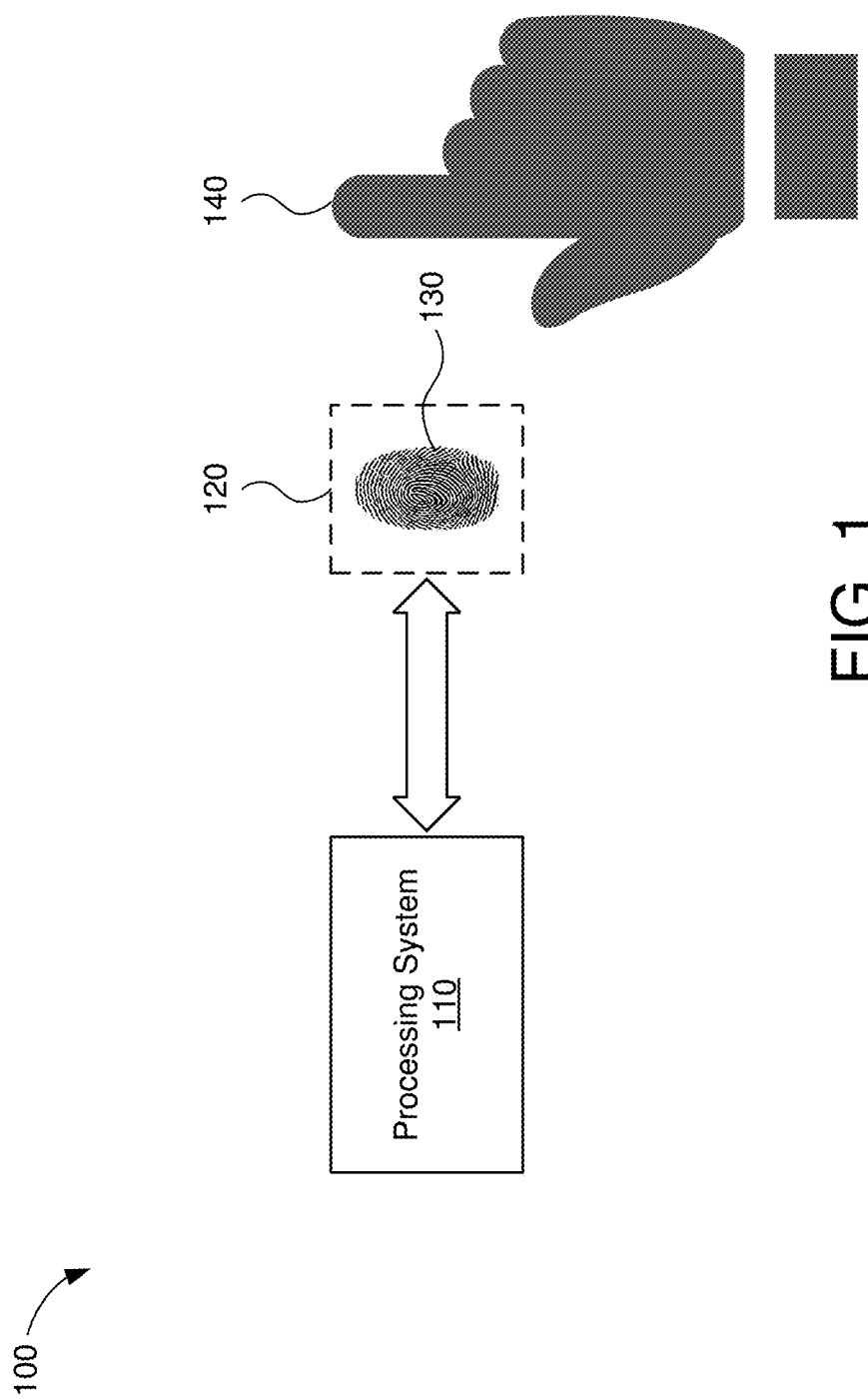
FIG. 1 shows an example input device which may be used with the present implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general-purpose processor, conventional processor, controller, microcontroller, special-purpose processor, and/or state machine capable of executing scripts or instructions of one or more software programs stored in memory.

Various implementations relate generally to input devices capable of fingerprint sensing. Some implementations more specifically relate to a fingerprint sensor assembly having an input surface and housing formed of a single layer of dielectric material. In some implementations, the sensor assembly may include a cover layer and a first sensor apparatus. The cover layer is molded from a first material (such as plastic, mylar, or polymer) having a planar surface and a non-uniform thickness, where a thickness of the material at a first region of the cover layer is less than a thickness of the material surrounding the first region. The first sensor apparatus is disposed beneath the planar surface of the cover layer, within the first region, and configured to transmit and receive first capacitive sensing signals through a portion of the planar surface coinciding with the first region. In some other implementations, a second sensor apparatus may be disposed beneath the planar surface of the cover layer, in a second region surrounding the first region, and configured to transmit and receive second capacitive sensing signals through a portion of the planar surface coinciding with the second region.

Particular implementations of the subject matter described in this disclosure can be implemented to realize one or more of the following potential advantages. In some implementations, the described techniques can be used to manufacture a low-cost fingerprint sensor assembly offering robust performance and user experience. For example, by molding the input surface and housing from a single layer of material, the manufacturing and assembly processes can be streamlined, and associated costs reduced. By using a plastic or polymer material for the cover layer, the input surface can be made very thin while maintaining a relatively high dielectric constant, thus improving the performance of the fingerprint sensor. Further, by integrating the fingerprint sensor with additional sensor devices (such as a proximity sensor) under the same cover layer, the sensor apparatus may provide a continuous or uninterrupted input surface capable of receiving multiple forms of user input. The continuous input surface may improve user experience while reducing or eliminating "dead zones" at the transitions or intersections between the fingerprint sensor and the additional sensor devices.

FIG. 1 shows an example input device 100 which may be used with the present implementations. The input device 100 includes a processing system 110 and a sensing region 120.

In some implementations, the input device 100 may be configured to provide input and/or control access to an electronic system (not shown for simplicity). Example electronic systems may include, but are not limited to, personal computing devices (e.g., desktop computers, laptop computers, netbook computers, tablets, web browsers, e-book readers, personal digital assistants (PDAs), and the like), composite input devices (e.g., physical keyboards, joysticks, key switches, and the like), data input device (e.g., remote controls, mice, and the like), data output devices (e.g., display screens printers, and the like), remote terminals, kiosks, video game machines (e.g., video game consoles, portable gaming devices, and the like), communication devices (e.g., cellular phones, smartphones, and the like), and media devices (e.g., recorders, editors, televisions, set-top boxes, music players, digital photo frames, digital cameras, and the like).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example suitable technologies may include Inter-Integrated Circuit ($I^2C$), Serial Peripheral Interface (SPI), PS/2, Universal Serial bus (SUB), Bluetooth®, Infrared Data Association (IrDA), and various radio frequency (RF) communication protocols defined by the IEEE 802.11 family of standards.

In the example of FIG. 1, the input device 100 may correspond to a fingerprint sensor (also referred to as a "fingerprint scanner" or "fingerprint sensing apparatus") configured to sense input provided by an input object 140 in the sensing region 120. In some implementations, the input object 140 may correspond to a user's finger or fingertip. The sensing region 120 may encompass any space above, around, in, and/or proximate to the input device 100 in which the input device 100 is able to detect user input. The size, shape, and/or location of the sensing region 120 may vary depending on actual implementations. In some implementations, the sensing region 120 may extend from a surface of the input device 100 in one or more directions in space, for example, until a signal-to-noise ratio (SNR) of the sensors falls below a threshold suitable for fingerprint detection. For example, the distance to which the sensing region 120 extends in a particular direction may be on the order of less than a millimeter, millimeters, centimeters, or more, and may vary with the type of sensing technology used and/or accuracy desired.

The input device 100 may utilize various sensing technologies to detect user input. Example sensing technologies may include capacitive, optical, and ultrasonic sensing technologies. In some implementations, the sensing region 120 may be formed by an array of capacitive sensing elements (e.g., sensor electrodes) that are used to measure changes in capacitance resulting from a finger interacting with the sensing region 120. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. More specifically, the changes in voltage and/or current at various points in the array may be correlated to the ridges and valleys in the user's finger.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" electrodes and one or more "receiver" electrodes. Transmitter electrodes may be modulated relative to the receiver electrodes. For example, the transmitter electrodes may be modulated relative to a reference voltage to transmit signals, while the receiver electrodes may be held at a relatively constant voltage to "receive" the transmitted signals. The signals received by the receiver electrodes may be affected by environmental interference (e.g., from objects in contact with, or in close proximity to, the sensor electrodes). In some aspects, each sensor electrode may either be a dedicated transmitter or a dedicated receiver. In other aspects, each sensor electrode may be configured to transmit and to receive.

The processing system 110 may be configured to operate the hardware of the input device 100 to detect input in the sensing region 120. In some implementations, the processing system 110 may control one or more sensor electrodes to detect objects and/or fingerprints in the sensing region 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In some other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

The processing system 110 may be implemented as a set of modules that are implemented in firmware, software, or a combination thereof. Example modules include hardware operation modules for operating hardware such as one or more sensing elements; data processing modules for processing data such as sensor signals; and reporting modules for reporting information to other components of the electronic system such as a host processor or CPU. In some implementations, the processing system 110 may include sensor operation modules configured to operate sensing elements to detect user inputs in the sensing region 120; authentication modules configured to authenticate a user of the input device 100 and/or electronic system based at least in part on the user inputs; identification modules configured to identify gestures associated with certain user inputs; and mode changing modules for changing operation modes of the input device 100 and/or electronic system.

The processing system 110 may respond to user input in the sensing region 120 by triggering one or more actions. Example actions include changing an operation mode of the input device 100 and/or authenticating a user of the input device 100. In some implementations, the processing system 110 may provide information about the detected input to the electronic system (e.g., to a CPU of the electronic system). The electronic system may then process information received from the processing system 110 to carry out additional actions (e.g., changing a mode of the electronic system and/or authentication operations).

The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode In some implementations, the processing system 110 may scan the sensor electrodes to capture or acquire a capacitive "image" of the fingerprint 140 when it is placed on the sensing region 120 of the input surface. Variations in capacitance across the image may be interpreted as a pattern of ridges and valleys in the user's fingertip (e.g., representing the user's fingerprint). The detail and accuracy of the capacitive sensing information may be affected by the input surface through which the sensing signals are transmitted and received. For example, input surfaces made from thinner materials and/or with higher dielectric constants tend to produce more accurate sensing information. Thus, some fingerprint sensors are manufactured by placing a very thin sheet of cover material (such as glass) on top of an open housing that surrounds the capacitive sensing elements. The cover sheet serves as an input surface while closing off the housing and encapsulating the sensing elements therein. However, such multi-piece housing assemblies are often fragile, expensive to manufacture, and offer limited customizability.

In some implementations, the housing assembly for the input device 100 may be produced from a single layer of material and/or compound. For example, the material forming the housing assembly may have a non-uniform thickness, where an open region coinciding with the input surface is thinner than a surrounding region (e.g., which provides lateral support or remainder of the housing). The fingerprint sensor may be disposed within the open region such that the sensor electrodes are positioned just below the input surface. In some implementations, the housing assembly may be molded from a polymer material (such as plastic, mylar, and the like). The polymer material can be molded into a very thin input surface with a relatively high dielectric constant (e.g., higher than that of glass), allowing for robust capacitive sensing measurements. In contrast to existing multi-piece housing assemblies, the housing assembly of the present implementations may be produced by a single manufacturing (e.g., molding) process.

Figure 2A:
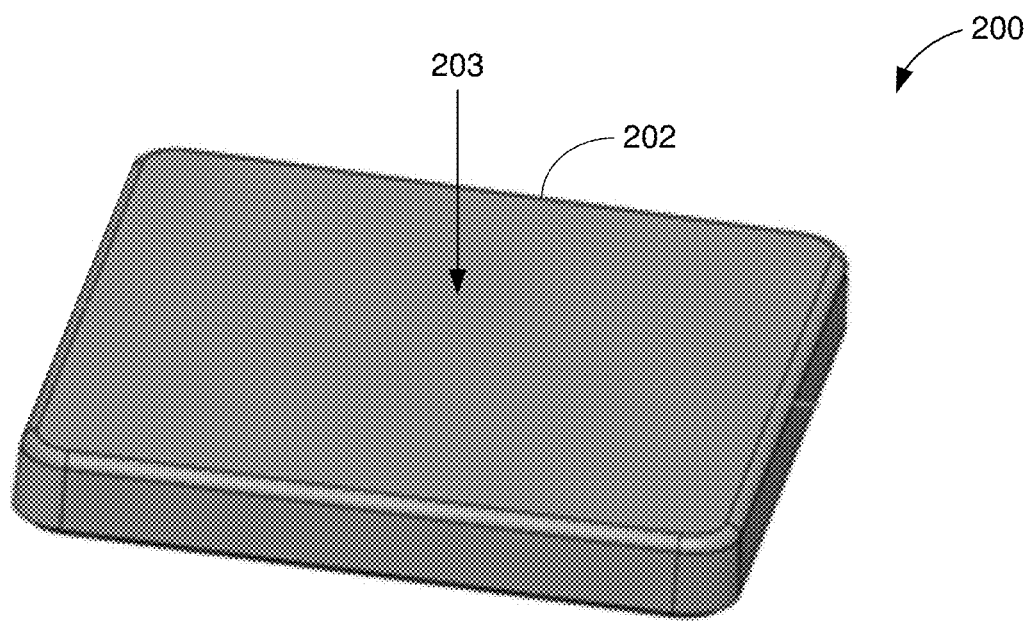
FIGS. 2A and 2B show an example sensor assembly, in accordance with some implementations.
Figure 2B:
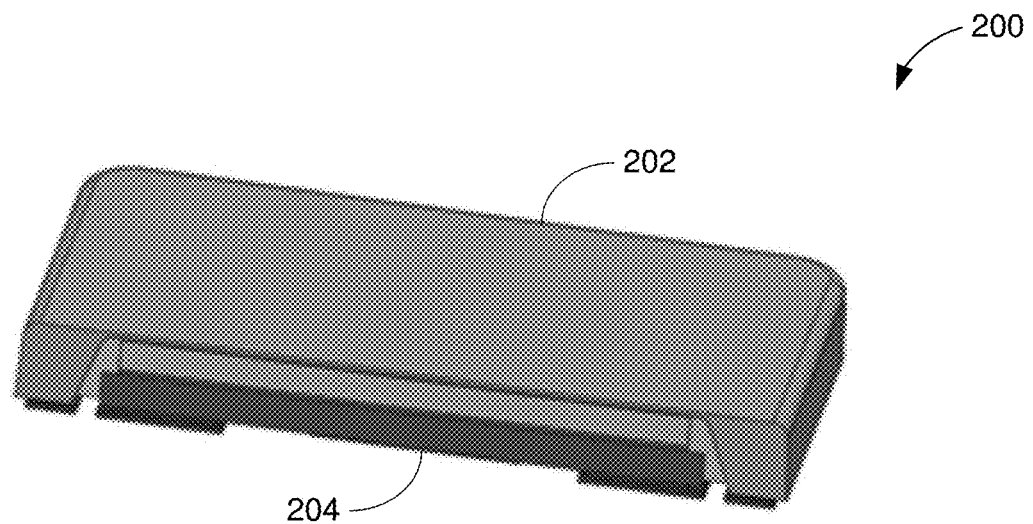

FIGS. 2A and 2B show an example sensor assembly 200, in accordance with some implementations. Specifically, FIG. 2A shows an isometric view of the sensor assembly 200 and FIG. 2B shows a cross-sectional view of the sensor assembly 200. In some implementations, the sensor assembly 200 may be one example of the input device 100 of FIG. 1.

In the example of FIGS. 2A and 2B, the sensor assembly 200 is configured as a keycap structure, for example, which may be included or integrated with a keyboard or keypad. The sensor assembly 200 includes a fingerprint sensor 204 and a cover layer 202 having a substantially planar surface 203. As shown in FIG. 2B, the cover layer 202 is formed from a single layer of material (such as plastic, mylar, or polymer) having a non-uniform thickness. The fingerprint sensor 204 is disposed below the cover layer 202, in an open region where the material is thinnest. Thus, the planar surface 203 of the cover layer 202 may provide an input surface for capturing or acquiring fingerprints. For example, the planar surface 203 may include the sensing region 102 of FIG. 1.

Figure 3A:
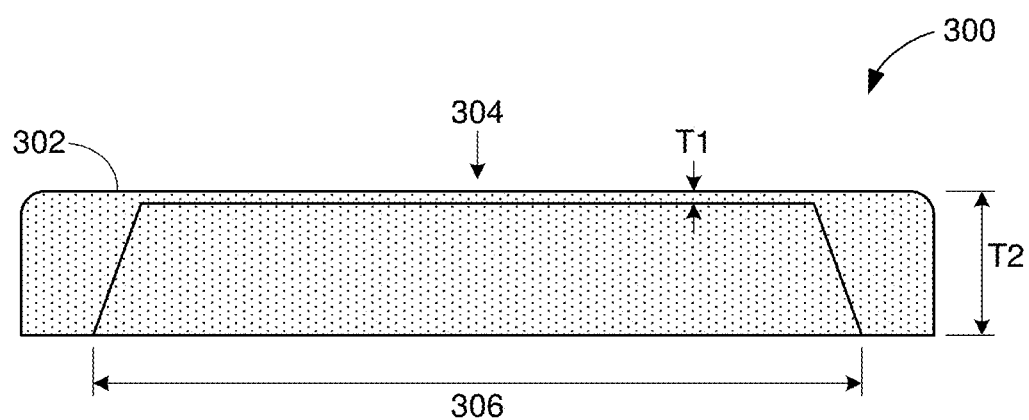
FIGS. 3A-3C show cross-sectional views of an example sensor assembly at various stages of a manufacturing process, in accordance with some implementations.
Figure 3B:
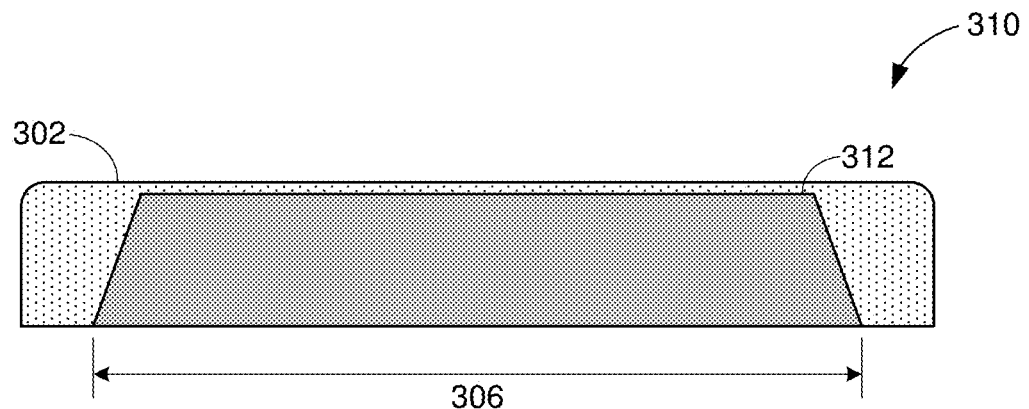
Figure 3C:
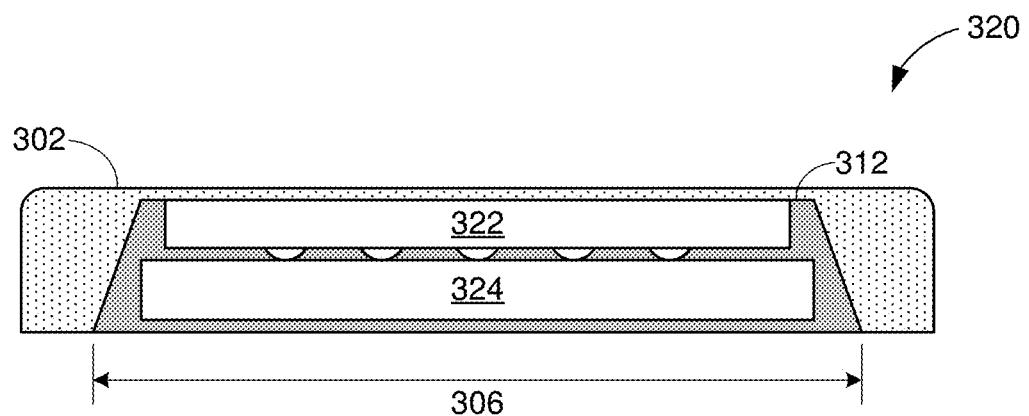

FIGS. 3A-3C show cross-sectional views 300-320, respectively, of an example sensor assembly at various stages of a manufacturing process, in accordance with some implementations. In some implementations, the manufacturing process described with respect to FIGS. 3A-3C may be used to manufacture the sensor assembly 200 of FIG. 2. Thus, the sensor assembly of FIGS. 3A-3C may correspond to a fingerprint sensor assembly. In some implementations, the sensor assembly may be configured as a keycap.

As shown in FIG. 3A, a cover layer 302 may be molded from a first material. In some implementations, the first material may be a polymer such as, for example, plastic, mylar, and the like. Further, in some implementations, the first material may be selected to have a relatively high dielectric constant. In some aspects, the first material may be opaque (e.g., colored). In some other aspects, the first material may be translucent. As shown in FIG. 3A, the cover layer 302 has a substantially planar surface 304 and a non-uniform thickness. In some implementations, the outer surface of the cover layer 302 may be painted for aesthetics and/or to obfuscate the circuitry disposed therein. In some other implementations, text and/or images may be printed on the planar surface 304 to indicate the use or function of the sensor assembly. The thickness (T1) of the material in an open region 306 below the planar surface 304 may be substantially less (e.g., thinner) than the thickness (T2) of the material surrounding the open region 306. As such, the open region 306 provides an opening or cavity in the cover layer 302 within which a sensor device may be disposed.

As shown in FIG. 3B, a glue or adhesive 312 is dispensed into the open region 306 of the cover layer 302. More specifically, the glue 312 may be used to bond a sensor device to the cover layer 302, on the underside of the planar surface 304. In some implementations, the glue 312 may be a thermal-type glue which may be cured or set using heat. In the example of FIG. 3B, the glue 312 is shown to fill the open region 306 of the cover layer 302. However, smaller or larger amounts of glue 312 may be used in other implementations.

As shown in FIG. 3C, a sensor device is disposed or inserted into the open region 306 of the cover layer 302. In some implementations, the sensor device may be a fingerprint sensor including an array of sensor electrodes 322 coupled to a printed circuit board (PCB) 324. The sensor electrodes 322 may be configured to transmit and receive capacitive sensing signals used for fingerprint detection. The PCB may include circuitry (such as one or more processors) for operating the sensor electrodes 322 and/or interpreting the capacitive sensing signals. Alternatively, or additionally, the PCB 324 may include circuitry (such as pins, traces, and the like) for routing the capacitive sensing signals to and from an external processor or CPU. In some implementations, the sensor electrodes 322 may be stacked on top of the PCB 324. This allows the sensor electrodes 322 to be positioned in close proximity of the planar surface 304 and thus transmit and receive capacitive sensing signals through the planar surface 304 of the cover layer 302. With the sensor device properly positioned under the planar surface 304, the glue 312 may be heated or cured to bond and/or encapsulate the sensor device with the cover layer 302.

Figure 4A:
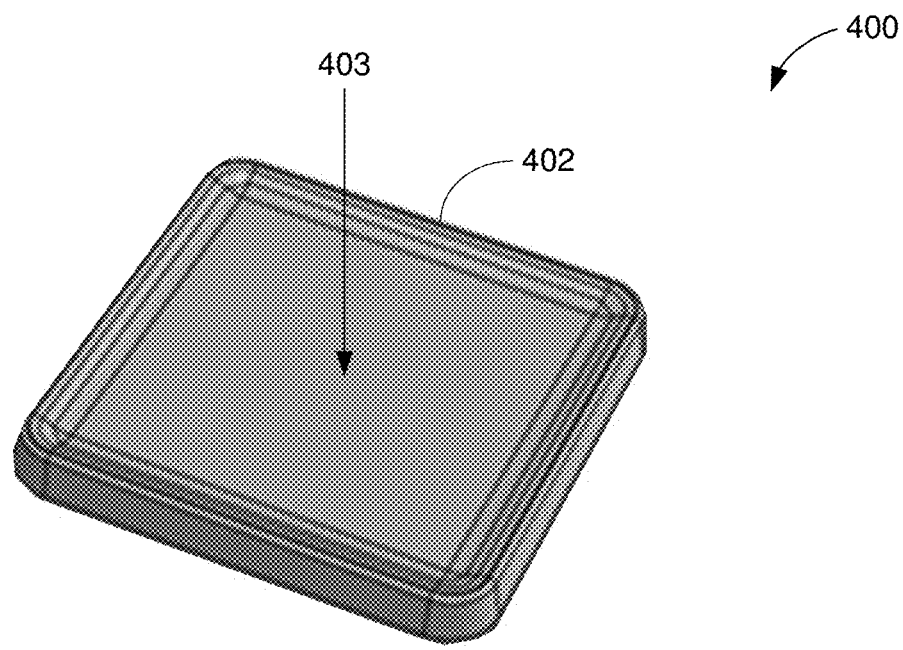
FIGS. 4A and 4B show another example sensor assembly, in accordance with some implementations.
Figure 4B:
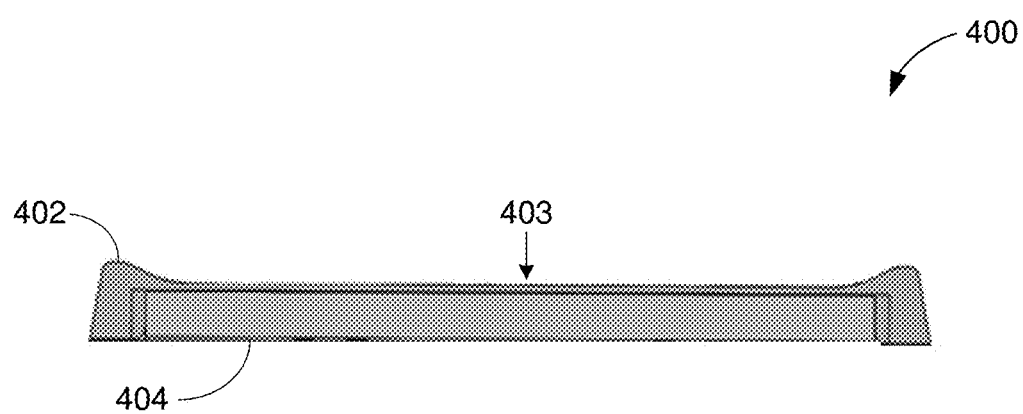

FIGS. 4A and 4B show another example sensor assembly 400, in accordance with some implementations. Specifically, FIG. 4A shows an isometric view of the sensor assembly 400 and FIG. 4B shows a cross-sectional view of the sensor assembly 400. In some implementations, the sensor assembly 400 may be one example of the input device 100 of FIG. 1. Further, in some implementations, the sensor assembly 400 may be manufactured using the process described with respect to FIGS. 3A-3C.

The sensor assembly 400 includes a fingerprint sensor 404 and a cover layer 402 having a substantially planer surface 403. In the example of FIGS. 4A and 4B, the cover layer 402 is formed from a single layer of material (such as plastic, mylar, or polymer) having a non-uniform thickness. More specifically, the cover layer 402 is molded to include raised or contoured edges around the border or perimeter of the planar surface 403. The fingerprint sensor 404 is disposed below the cover layer 404, in an open region where the material is thinnest. Thus, the planar surface 403 of the cover layer 402 may provide an input surface for capturing or acquiring fingerprints and the contoured edges may serve as a guide for the placement of the user's finger.

Figure 5A:
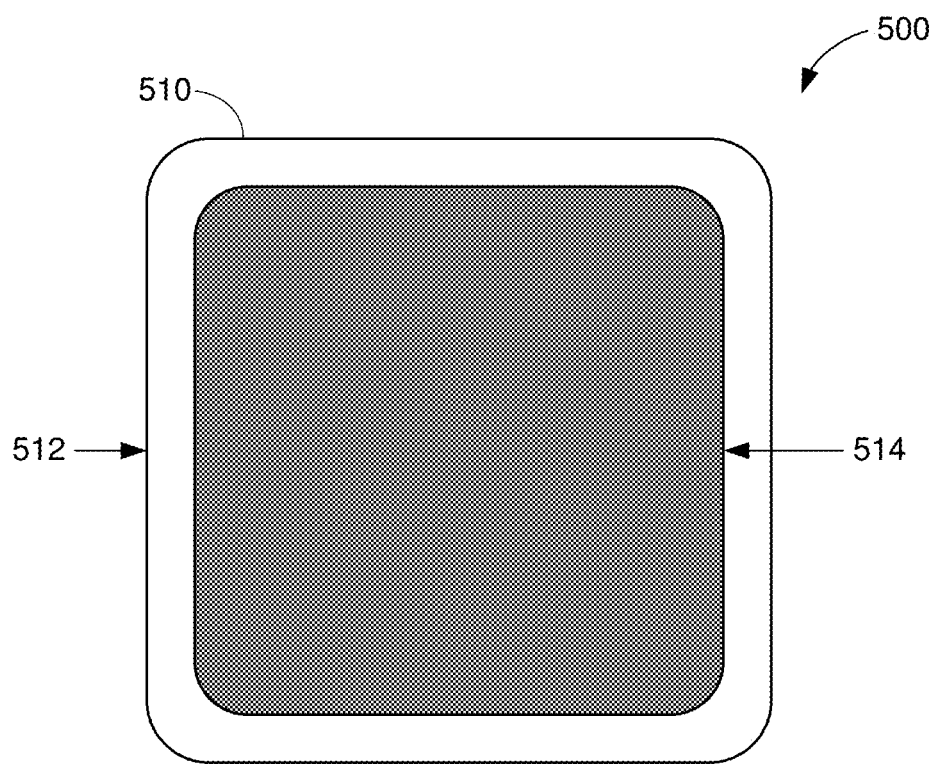
FIGS. 5A and 5B show another example sensor assembly, in accordance with some implementations.
Figure 5B:
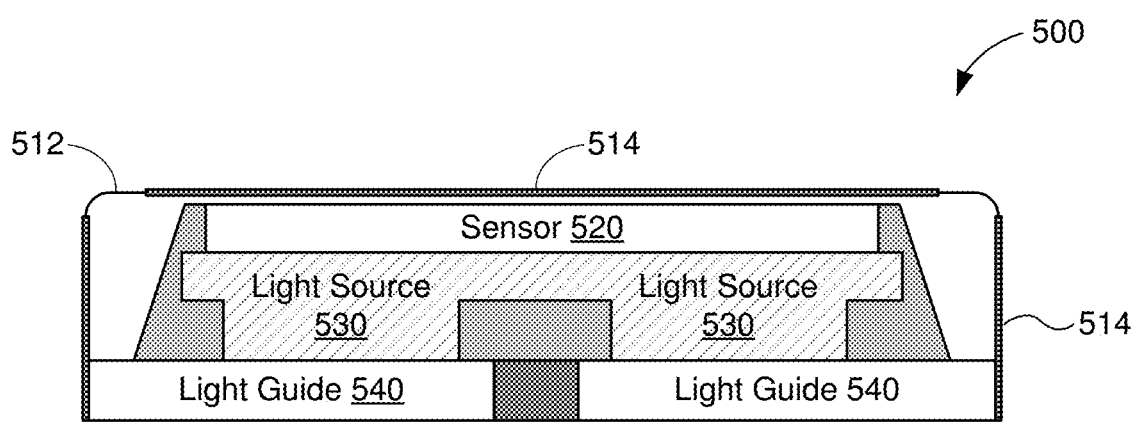

FIGS. 5A and 5B show another example sensor assembly 500, in accordance with some implementations. Specifically, FIG. 5A shows a top view of the sensor assembly 500 and FIG. 5B shows a cross-sectional view of the sensor assembly 500. In some implementations, the sensor assembly 500 may be one example of the input device 100 of FIG. 1. Further, in some implementations, the sensor assembly 500 may be manufactured using the processes described with respect to FIGS. 3A-3C.

As shown in FIG. 5A, the sensor assembly 500 includes a cover layer 510 configured to emit or transmit light via a light ring 512. In some implementations, the cover layer 510 may be molded from a translucent material (such as plastic, mylar, or polymer) capable of transmitting light. The surfaces 514 surrounded by the light ring 512 may be painted to limit or localize the emitted light to the unpainted region forming the light ring 512. As shown in FIG. 5B, the sensor assembly 500 further includes a fingerprint sensor 520 disposed beneath the cover layer 510 and one or more light sources 530 disposed below the sensor 520. In some implementations, the light sources 530 may include light emitting diodes (LEDs) or any other light source capable of emitting light in the visible, spectrum. In some implementations, the light sources 530 may be coupled to the fingerprint sensor 520. For example, the light sources 530 may be configured to emit specific patterns and/or colors of light to indicate a status or configuration of the fingerprint sensor 520. In some implementations, the sensor assembly 500 may further include one or more light guides 540 to help direct the light emitted by the light sources 530 to the light ring 512 in the cover layer 510.

Figure 6A:
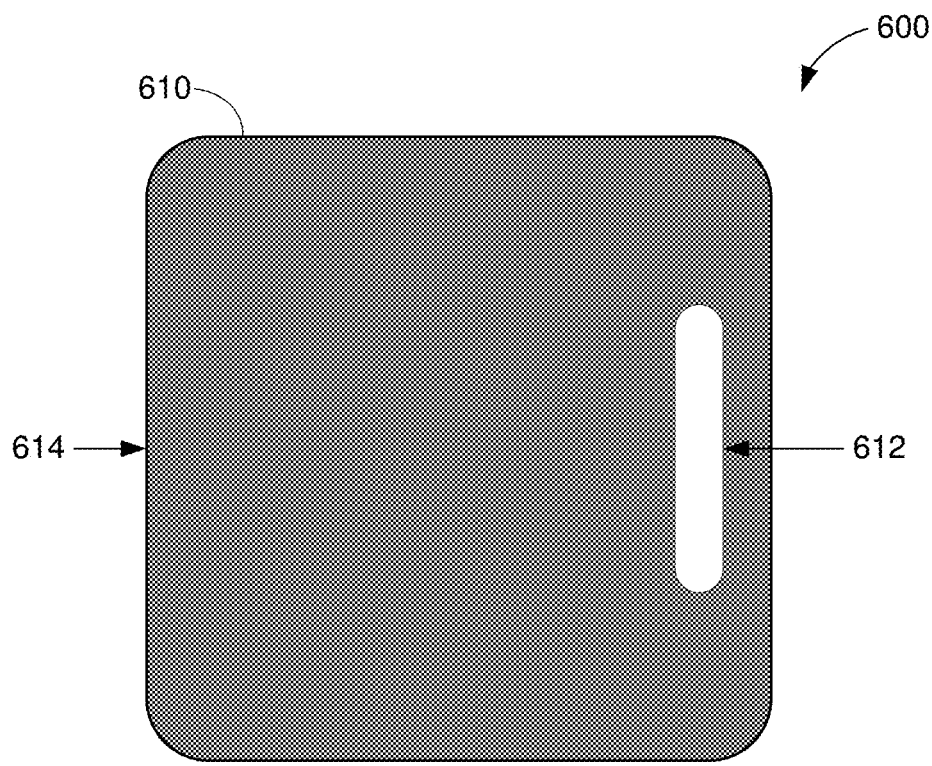
FIGS. 6A and 6B show another example sensor assembly, in accordance with some implementations.
Figure 6B:
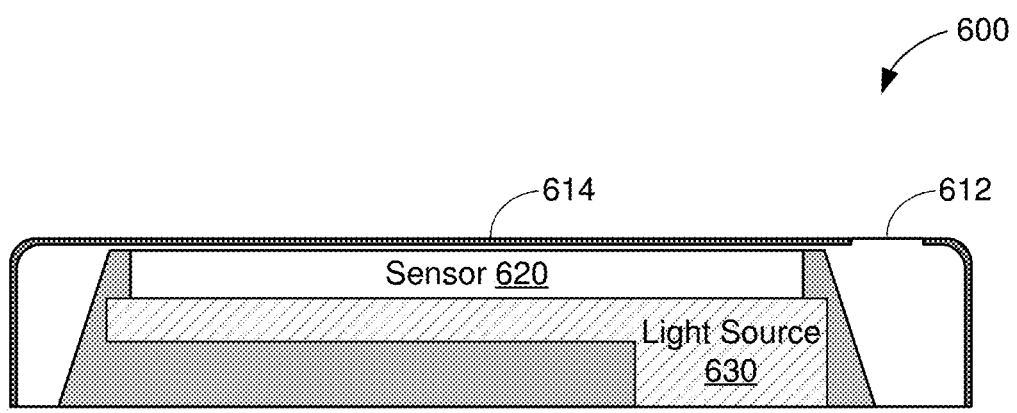

FIGS. 6A and 6B show another example sensor assembly 600, in accordance with some implementations. Specifically, FIG. 6A shows a top view of the sensor assembly 600 and FIG. 6B shows a cross-sectional view of the sensor assembly 600. In some implementations, the sensor assembly 600 may be one example of the input device 100 of FIG. 1. Further, in some implementations, the sensor assembly 600 may be manufactured using the process described with respect to FIGS. 3A-3C.

As shown in FIG. 6A, the sensor assembly 600 includes a cover layer 610 configured to emit or transmit light via a light bar 612. In some implementations, the cover layer 610 may be molded from a translucent material (such as plastic, mylar, or polymer) capable of transmitting light. The surfaces 614 surrounding the light bar 612 may be painted to limit or localize the emitted light to the unpainted region forming the light bar 612. As shown in FIG. 6B, the sensor assembly 600 further includes a fingerprint sensor 620 disposed beneath the cover layer 610 and one or more light sources 630 disposed below the sensor 620. In some implementations, the light sources 630 may include LEDs or any other light source capable of emitting light in the visible, IR, or UV spectrum. In some implementations, the light sources 630 may be coupled to the fingerprint sensor 620. For example, the light sources 630 may be configured to emit specific patterns and/or colors of light to indicate a status or configuration of the fingerprint sensor 620.

Figure 7:
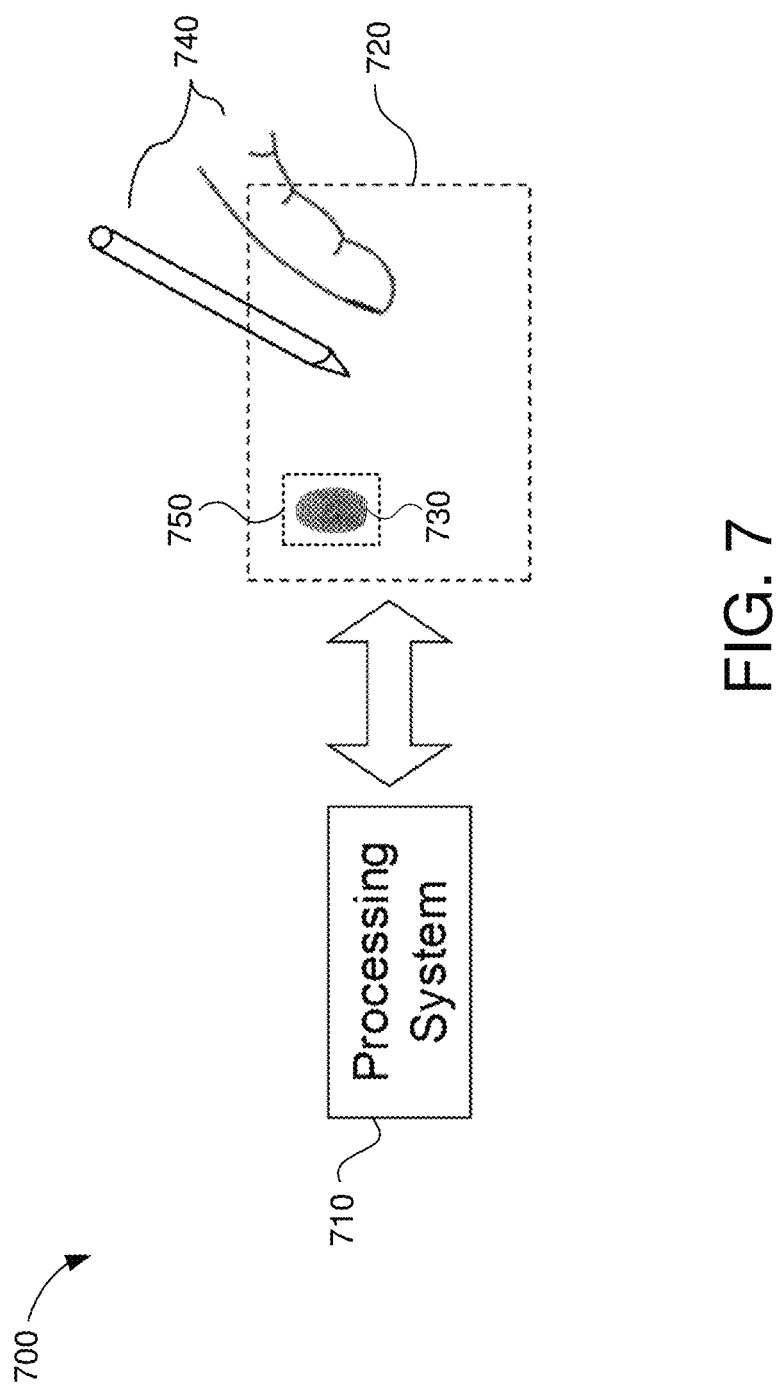
FIG. 7 shows another example input device which may be used with the present implementations.

FIG. 7 shows another example input device 700 which may be used with the present implementations. The input device 700 includes a processing system 710 and a sensing region 720. The input device 700 may be configured to provide input to an electronic system (not shown for simplicity). Examples of electronic systems may include personal computing devices (e.g., desktop computers, laptop computers, netbook computers, tablets, web browsers, e-book readers, and PDAs), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 700 may be implemented as a physical part of the corresponding electronic system. Alternatively, the input device 700 may be physically separated from the electronic system. The input device 700 may be coupled to (and communicate with) components of the electronic system using various wired and/or wireless interconnection and communication technologies, such as buses and networks. Examples technologies may include I²C, SPI, PS/2, USB, Bluetooth®, IrDA, and various RF communication protocols defined by the IEEE 802.11 family of standards.

In the example of FIG. 7, the input device 700 may correspond to a proximity sensor device (e.g., also referred to as a "touchpad" or "touch sensor device") configured to sense input provided by one or more input objects 740 in the sensing region 720. Example input objects 740 include fingers, styli, and the like. The sensing region 720 may encompass any space above, around, in, and/or proximate to the input device 700 in which the input device 700 is able to detect user input (such as provided by one or more input objects 740). The size, shape, and/or location of the sensing region 720 (e.g., relative to the electronic system) may vary depending on actual implementations.

In some implementations, the sensing region 720 may extend from a surface of the input device 700 in one or more directions in space, for example, until an SNR of the sensors falls below a threshold suitable for object detection. For example, the distance to which the sensing region 720 extends in a particular direction may be on the order of less than a millimeter, millimeters, centimeters, or more, and may vary with the type of sensing technology used and/or accuracy desired. In some implementations, the sensing region 720 may detect inputs involving no physical contact with any surfaces of the input device 700, contact with an input surface (e.g., a touch surface and/or screen) of the input device 700, contact with an input surface of the input device 700 coupled with some amount of applied force or pressure, and/or any combination thereof.

In some implementations, input surfaces may be provided by, and/or projected on, one or more surfaces of a housing of the input device 700 (e.g., as an image). For example, the sensing region 720 may have a rectangular shape when projected onto an input surface of the input device 700. In some aspects, inputs may be provided through images spanning one, two, three, or higher dimensional spaces in the sensing region 720. In some other aspects, inputs may be provided through projections along particular axes or planes in the sensing region 720. Still further, in some aspects, inputs may be provided through a combination of images and projections in the sensing region 720.

The input device 700 may utilize various sensing technologies to detect user input. Example sensing technologies may include capacitive, elastive, resistive, inductive, magnetic, acoustic, ultrasonic, thermal, and optical sensing technologies. In some implementations, the input device 700 may utilize capacitive sensing technologies to detect user inputs. For example, the sensing region 720 may include one or more capacitive sensing elements (e.g., sensor electrodes) to create an electric field. The input device 700 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 720. As described above, example capacitive sensing technologies may be based on absolute capacitance and/or transcapacitance.

The processing system 710 may be configured to operate the hardware of the input device 700 to detect input in the sensing region 720. In some implementations, the processing system 710 may control one or more sensor electrodes to detect objects in the sensing region 720. For example, the processing system 710 may be configured to transmit signals via one or more transmitter sensor electrodes and receive signals via one or more receiver sensor electrodes. In some aspects, one or more components of the processing system 710 may be co-located, for example, in close proximity to the sensing elements of the input device 700. In some other aspects, one or more components of the processing system 710 may be physically separated from the sensing elements of the input device 700. For example, the input device 700 may be a peripheral coupled to a computing device, and the processing system 710 may be implemented as software executed by a CPU of the computing device. In another example, the input device 700 may be physically integrated in a mobile device, and the processing system 720 may correspond, at least in part, to a CPU of the mobile device.

In some implementations, the processing system 710 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some implementations, the processing system 710 may include sensor operation modules configured to operate sensing elements to detect user input in the sensing region 720; identification modules configured to identify gestures such as mode changing gestures; and mode changing modules for changing operation modes of the input device 700 and/or electronic system.

The input device 700 may include additional input components that can be operated by the processing system 710 or another processing system. In some implementations, the additional input components may include a fingerprint sensor that may be used to authenticate a user of the input device 700 and/or the corresponding electronic system. For example, the fingerprint sensor may use capacitive fingerprint imaging technologies to detect and/or analyze a user's fingerprint 730 in a fingerprint scanning region 750. In some implementations, the fingerprint scanning region 750 may coincide with, or substantially overlap, the sensing region 720.

The processing system 710 may respond to user input in the sensing region 720 and/or fingerprint scanning region 750 by triggering one or more actions. Example actions include changing an operation mode of the input device 700 and/or graphical user interface (GUI) actions such as cursor movement, selection, menu navigation, and the like. In some implementations, the processing system 710 may determine positional information for a detected input. The term "positional information," as used herein, refers to any information describing or otherwise indicating a position or location of the detected input (e.g., within the sensing region 720). Example positional information may include absolute position, relative position, velocity, acceleration, and/or other types of spatial information. In some implementations, the processing system 710 may provide information about the detected input to the electronic system (e.g., to a CPU of the electronic system). The electronic system may then process information received from the processing system 710 to carry out additional actions (e.g., changing a mode of the electronic system and/or GUI actions).

The processing system 710 may operate the sensing elements of the input device 700 to produce electrical signals indicative of input (or lack of input) in the sensing region 720 and/or fingerprint scanning region 750. The processing system 710 may perform any appropriate amount of processing on the electrical signals to translate or generate the information provided to the electronic system. For example, the processing system 710 may digitize analog signals received via the sensor electrodes and/or perform filtering or conditioning on the received signals. In some aspects, the processing system 710 may subtract or otherwise account for a "baseline" associated with the sensor electrodes. For example, the baseline may represent a state of the sensor electrodes when no user input is detected. Accordingly, the information provided by the processing system 710 to the electronic system may reflect a difference between the signals received from the sensor electrodes and a baseline associated with each sensor electrode.

In some implementations, the processing system 710 may interpret positional information based on user inputs received, at least in part, via the fingerprint scanning region 750. For example, the positional information may correspond to a swipe gesture initiating in the sensing region 720 and crossing, or terminating in, the fingerprint scanning region 750. Aspects of the present disclosure recognize that it may be desirable to interpret such user inputs as gesture inputs rather than fingerprint inputs. However, in some input devices, the input surface associated with the scanning region 750 is disposed in a cutout window of the input surface associated with the sensing region 720. In other words, the fingerprint sensor (underlying the fingerprint scanning region 750) and the proximity sensor (underlying the sensing region 720) have different input surfaces that are manufactured separately and combined at an assembly stage. As a result, there exists a gap or opening at the transition or intersection of the fingerprint scanning region 750 and the sensing region 720. Such gaps may create "dead zones" in the sensing region 720 and/or the fingerprint scanning region 750 due to poor sensitivity and/or user experience.

In some implementations, a shared input surface for the sensing region 720 and the fingerprint scanning region 750 may be produced from a single layer of material and/or compound. For example, the material forming the input surface may have a non-uniform thickness, where an open region coinciding with the input surface is thinner than a surrounding region. The fingerprint sensor may be disposed within the open region such that the sensor electrodes are position just below the input surface. The proximity sensor may be disposed beneath the region of the input surface surrounding the open region. In some implementations, the input surface may be molded from a polymer material (such as plastic, mylar, and the like). The polymer material can be molded into a very thin input surface with a relatively high dielectric constant (e.g., higher than that of glass), allowing for robust capacitive sensing measurements. In contrast to existing input devices having multiple input surfaces, the input surface of the present implementations may be produced by a single manufacturing (e.g., molding) process.

Figure 8A:
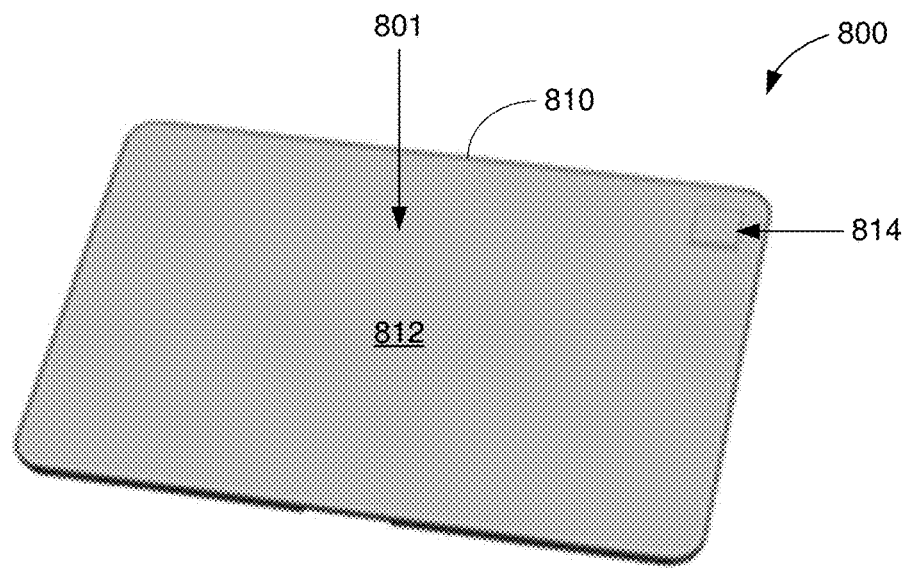
FIGS. 8A and 8B show another example sensor assembly, in accordance with some implementations.
Figure 8B:
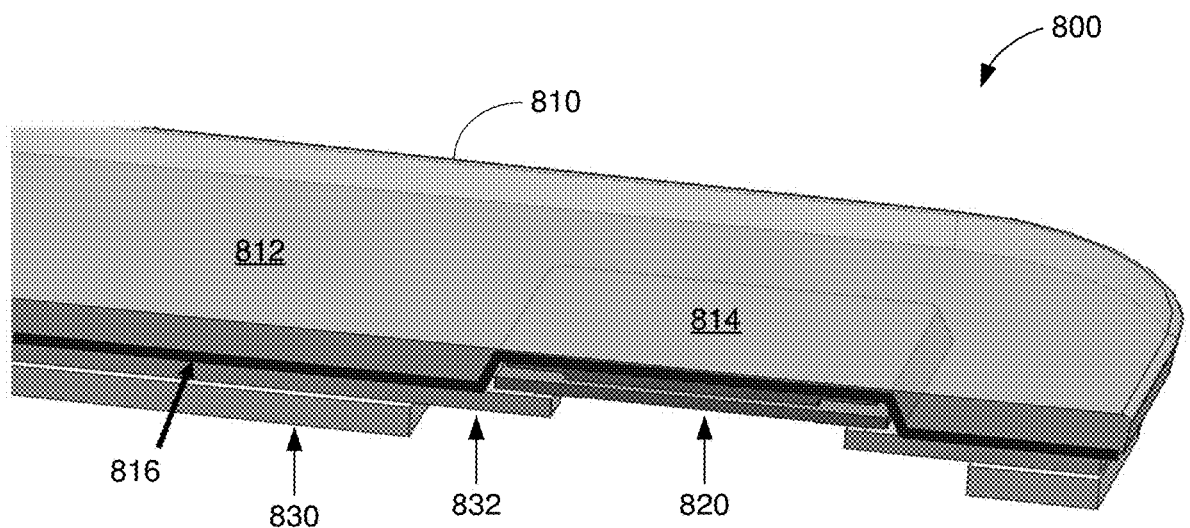

FIGS. 8A and 8B show another example sensor assembly 800, in accordance with some implementations. Specifically, FIG. 8A shows an isometric view of the sensor assembly 800 and FIG. 8B shows a cross-sectional view of the sensor assembly 800 (e.g., the upper-right hand corner of the sensor assembly 800). In some implementations, the sensor assembly 800 may be one example of the input device 700 of FIG. 7.

In the example of FIGS. 8A and 8B, the sensor assembly 800 is configured as a touchpad or trackpad, for example, which may be included or integrated with a keyboard or keypad. The sensor assembly 800 includes a fingerprint sensor 820, a proximity sensor 830, and a cover layer 810 having a substantially planar surface 801. As shown in FIG. 8B, the cover layer 810 is formed from a single layer of material (such as plastic, mylar, or polymer) having a non-uniform thickness. The fingerprint sensor 820 is disposed below the cover layer 810, in an open region 814 where the material is thinnest. The proximity sensor 830 is also disposed below the cover layer 810, in a region 812 surrounding the open region 814. In some implementations, the fingerprint sensor 820 may be coupled to the proximity sensor 830 via a PCB 832 associated with the proximity sensor 830 (also referred to as a "proximity sensor PCB"). Still further, in some implementations, the underside 816 of the cover layer 810 may be painted for aesthetics (e.g., to provide a glass- or mirror-like finish) and/or to hide the circuitry below.

The planar surface 801 of the cover layer 810 may provide a continuous or uninterrupted input surface for detecting fingerprints and proximity information from one or more input objects. With reference for example to FIG. 7, the planar surface 801 may encompass the sensing region 720 and the fingerprint scanning region 750. More specifically, the fingerprint scanning region 750 may coincide with the open region 814 of the cover layer 810 and the sensing region 720 may coincide with the surrounding region 812 of the cover layer 810. Because there are no openings or gaps at the transitions or intersections between the open region 814 and the surrounding region 812, the sensor assembly 800 may provide improved performance and/or user experience compared to existing input devices having multiple input surfaces.

FIGS. 9A-9F show cross-sectional views 900-950, respectively, of another example sensor assembly at various stages of a manufacturing process, in accordance with some implementations. In some implementations, the manufacturing process described with respect to FIGS. 9A-9F may be used to manufacture the sensor assembly 800 of FIG. 8. Thus, the sensor assembly of FIGS. 9A-9F may correspond to a combined fingerprint and proximity sensor assembly. In some implementations, the sensor assembly may be configured as a touchpad or trackpad.

Figure 9A:
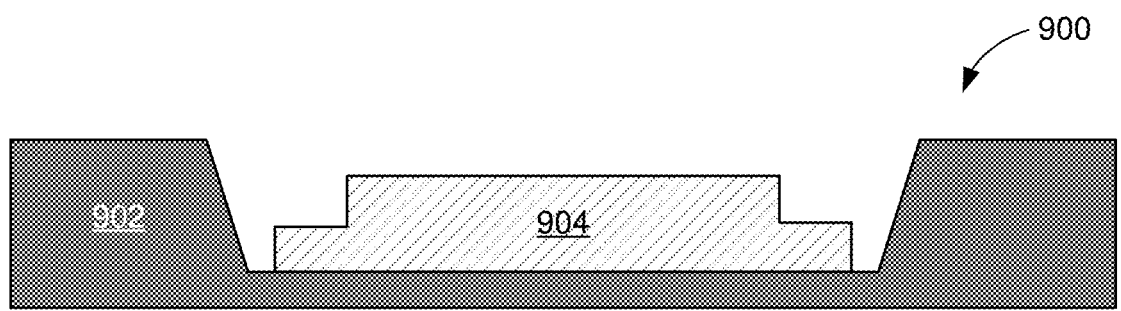
FIGS. 9A-9F show cross-sectional views of another example sensor assembly at various stages of a manufacturing process, in accordance with some implementations.

As shown in FIG. 9A, a fingerprint sensor 904 is placed in a cavity or opening of a fixture 902. Although not shown, for simplicity, the fingerprint sensor 904 may include an array of sensor electrodes coupled to a PCB. The sensor electrodes may be configured to transmit and receive capacitive sensing signals used for fingerprint detection. The PCB may include circuitry for operating the sensor electrodes and/or interpreting the capacitive sensing signals. Alternatively, or additionally, the PCB may include circuitry for routing the capacitive sensing signals to and from an external processor or CPU. In some implementations, the PCB may be stacked on top of the sensor electrodes such that the sensor electrodes are facing or adjacent to the fixture 902. This will allow the sensor electrodes to be positioned in close proximity to a cover layer to be added at a later stage of the manufacturing process.

Figure 9B:
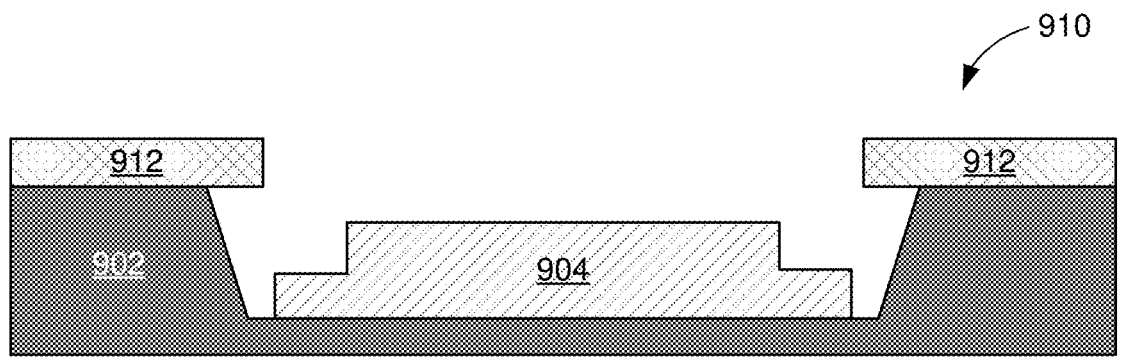

As shown in FIG. 9B, a proximity sensor PCB 912 may be placed on top of the fixture 902, surrounding the fingerprint sensor 904. The proximity sensor PCB 912 may be coupled to, or include, one or more sensor electrodes (not shown for simplicity) configured to transmit and receive capacitive sensing signals used for proximity detection. The proximity sensor PCB 912 may include circuitry for operating the sensor electrodes and/or interpreting the capacitive sensing signals. Alternatively, or additionally, the proximity sensor PCB 912 may include circuitry for routing the capacitive sensing signals to an external processor CPU. In some implementations, the proximity sensor PCB 912 may further provide a communications interface between the fingerprint sensor 904 and the proximity sensor.

Figure 9C:
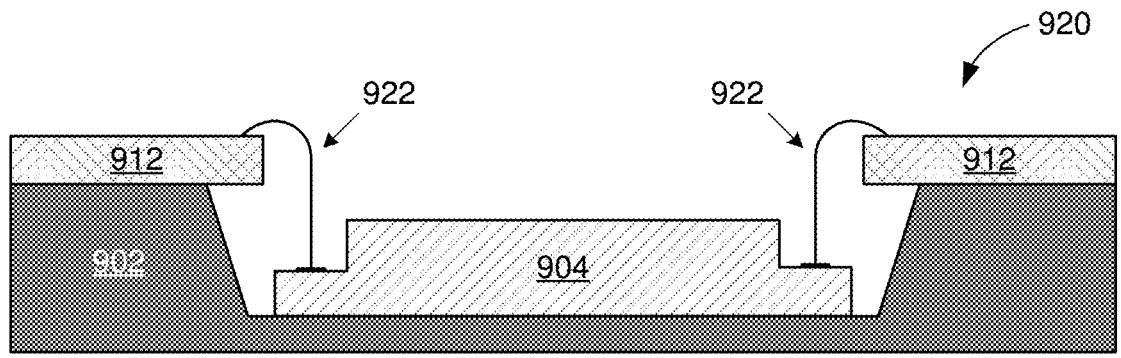

As shown in FIG. 9C, the proximity sensor PCB 912 is wire-bonded to the fingerprint sensor 904. More specifically, the fingerprint sensor 904 may be coupled to the proximity sensor PCB 912 via one or more wires 922. Aspects of the present disclosure recognize that wire bonding is a relatively low-cost technique for coupling the fingerprint sensor 904 to the proximity sensor PCB 912 (e.g., compared to a conventional solder flow process). However, unlike solder balls, the wires 922 may need to be encapsulated or otherwise protected from external elements.

Figure 9D:
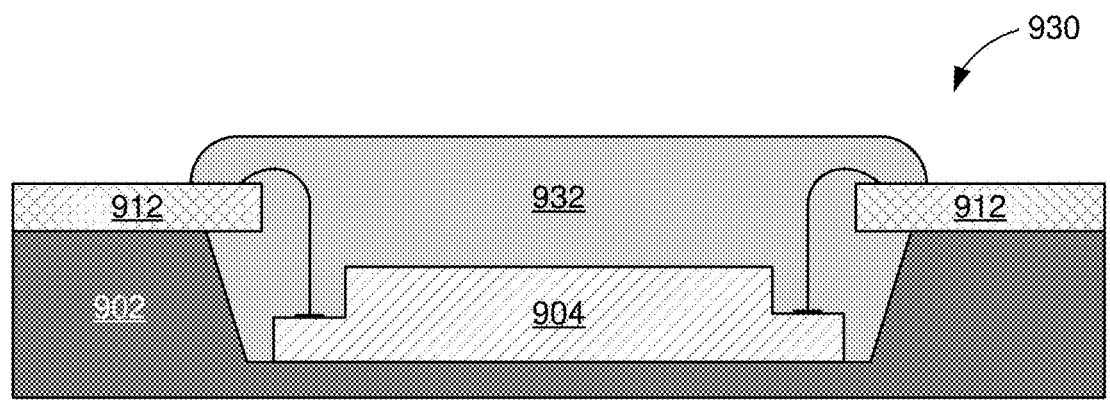

As shown in FIG. 9D, an epoxy mold compound or other filling materials (such as silicone) 932 is dispensed into the opening of the fixture 902. The epoxy mold compound 932 may be used to encapsulate and/or hold the wires 922 in place. For example, once cured, the epoxy mold compound 932 may prevent the wires 922 from bending or separating under external forces and/or stress. In some implementations, the epoxy mold compound 932 may be opaque. In some other implementations, the epoxy mold compound 932 may be translucent.

Figure 9E:
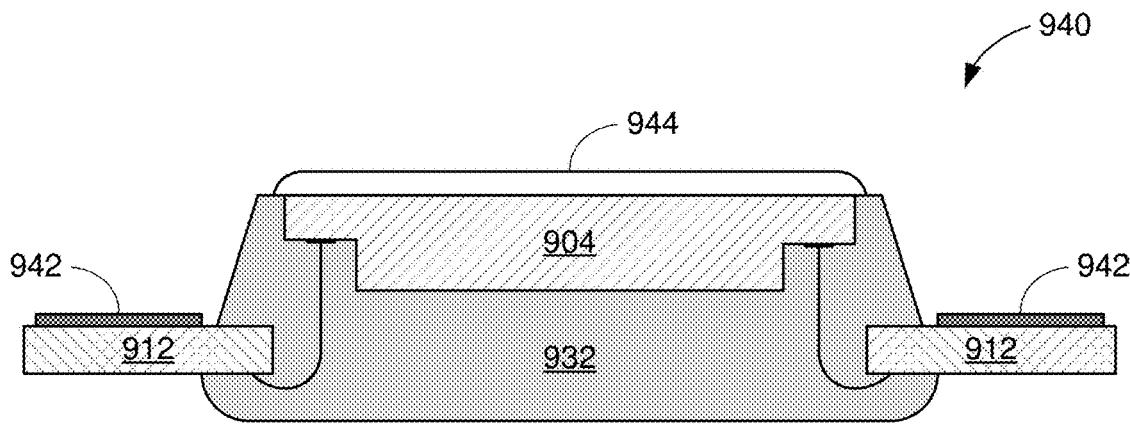

As shown in FIG. 9E, the fixture 902 is removed after the epoxy mold compounding 932 is cured. A glue 944 is dispensed on the surface of the fingerprint sensor 904 (e.g., the surface that was adjacent to the fixture 902) and one or more adhesives 942 are attached to the surfaces of the proximity sensor PCB 912 (e.g., the surfaces that were adjacent to the fixture 902). In some implementations, the glue 944 may be a thermal-type glue which may be cured or set using heat.

Figure 9F:
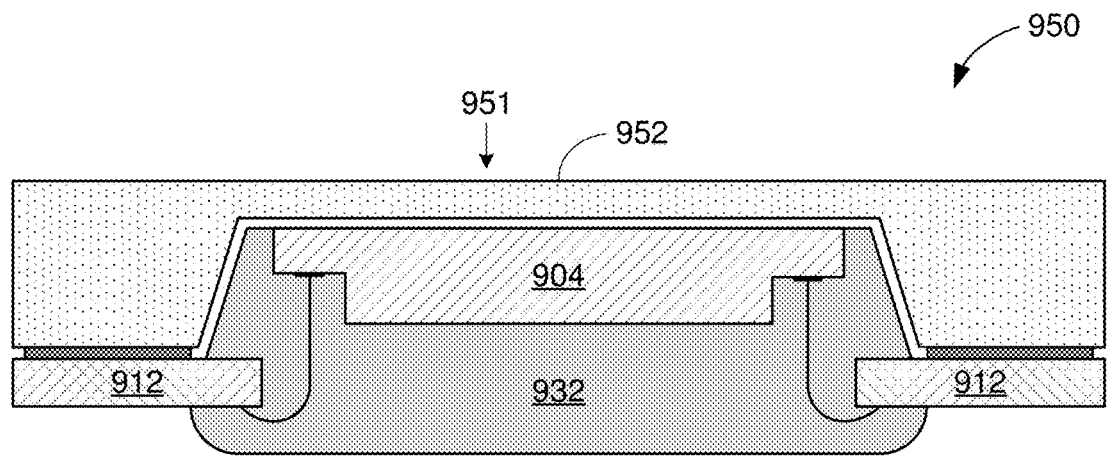

As shown in FIG. 9F, a cover layer 952 is placed over the sensor assembly and bonded or attached to the fingerprint sensor 904 and the proximity sensor PCB 912 via the glue 944 and adhesives 942, respectively. In some implementations, the cover layer 952 may be molded from a polymer material such as, for example, plastic, mylar, and the like. Further, in some implementations, the material may be selected to have a relatively high dielectric constant. In some aspects, the material may be opaque (e.g., colored). In some other aspects, the material may be translucent. As shown in FIG. 9F, the cover layer 952 has a substantially planar surface 951 and a non-uniform thickness. In some implementations, an underside of the cover layer 952 (e.g., opposite the planar surface 951) may be painted to provide a glass- or mirror-like finish and/or to obfuscate the circuitry disposed below. The thickness of the material in a region coinciding with the fingerprint sensor 904 may be less (e.g., thinner) than the thickness of the material coinciding with the proximity sensor PCB 912. As such, the fingerprint sensor 904 may be positioned closer to the planar surface 951 than the proximity sensor PCB 912.

Figure 10:
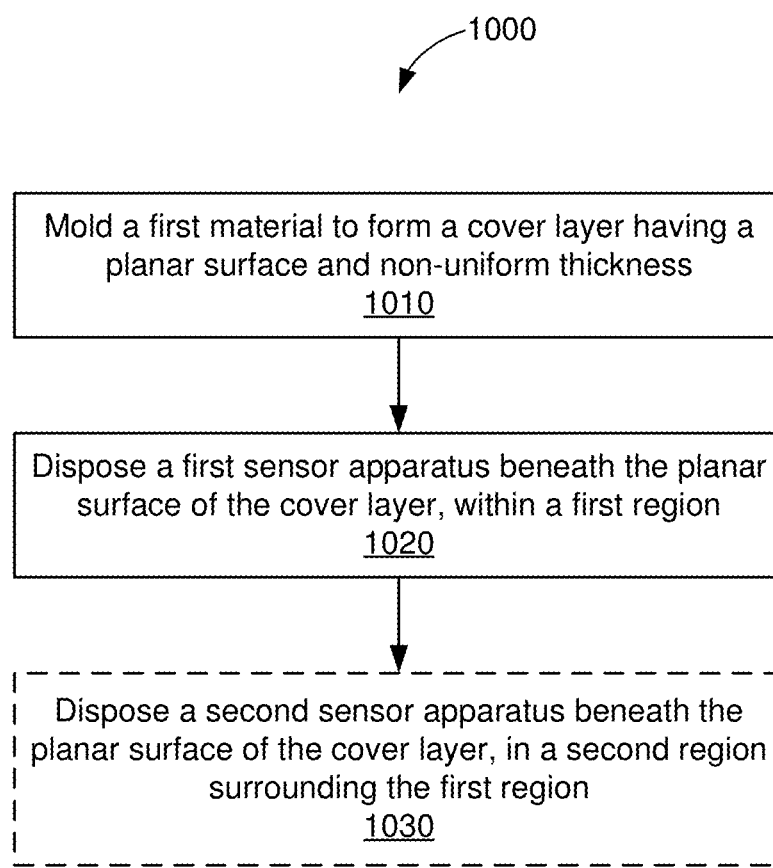
FIG. 10 shows an illustrative flowchart of a process for manufacturing a sensor assembly, in accordance with some implementations.

FIG. 10 shows an illustrative flowchart of a process 1000 for manufacturing a sensor assembly, in accordance with some implementations. More specifically, the process 1000 may be used to manufacture any of the example sensor assemblies described herein.

A first material is molded to form a cover layer having a planar surface and non-uniform thickness (1010). The first material may be a polymer such as plastic, mylar, or the like. In some aspects, the first material may be selected to have a relative high dielectric constant. The first material may be thinner in a first region of the cover layer, beneath the planar surface, and thicker in the region surrounding the first region. In some implementations, the cover layer may be molded to form a housing for a fingerprint sensor (such as described with respect to FIGS. 1-6B). In some other implementations, the cover layer may be molded to form a combined input surface for multiple sensor devices (such as described with respect to FIGS. 7-9F).

A first sensor apparatus is disposed beneath the planar surface of the cover layer, within the first region (1020). The first sensor apparatus may be configured to transmit and receive capacitive sensing signals through a portion of the planar surface coinciding with the first region. In some implementations, the first sensor apparatus may be a fingerprint sensor configured to detect fingerprints on the planar surface using capacitive sensing techniques. Accordingly, the first sensor apparatus may be positioned under the thinnest region of the cover layer such that the associated sensor electrodes are closest to the planar surface (such as described with respect to FIGS. 3C and 9F).

In some implementations, a second sensor apparatus may be disposed beneath the planar surface of the cover layer, in a second region surrounding the first region (1030). The second sensor apparatus may be configured to transmit and receive capacitive sensing signals through a portion of the planar surface coinciding with the second region. In some implementations, the second sensor apparatus may be a proximity sensor configured to determine positional information for objects on or proximate to the planar surface suing capacitive sensing techniques. However, because positional information may be less granular or accurate than the capacitive sensor data needed for fingerprint detection and authentication, the second sensor apparatus may be positioned under a thicker region of the cover layer such that the associated sensor electrodes are further away from the planar surface than the sensor electrodes used for fingerprint detection (such as described with respect to FIG. 9F).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, implementations have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A sensor assembly comprising:
   a cover layer molded from a first material to have a planar surface and non-uniform thickness, wherein a thickness of the first material at a first region of the cover layer is less than a thickness of the first material surrounding the first region, and wherein the first region forms an opening, opposite the planar surface, in the cover layer;
   a first sensor apparatus disposed within the opening formed by the first region and bonded directly to the cover layer, the first sensor apparatus being configured to transmit and receive first capacitive sensing signals through a portion of the planar surface coinciding with the first region; and
   a second sensor apparatus disposed beneath a second region of the cover layer having a different thickness than the first region, the second sensor apparatus being configured to transmit and receive second capacitive sensing signals through a portion of the planar surface coinciding with the second region.

2. The sensor assembly of claim 1, wherein the first material comprises plastic, mylar, epoxy molding compound, or polymer.

3. The sensor assembly of claim 1, wherein the first sensor apparatus comprises a fingerprint sensor configured to detect a fingerprint on the portion of the planar surface coinciding with the first region based on changes in the first capacitive sensing signals.

4. The sensor assembly of claim 1, wherein the first sensor apparatus is bonded directly to the cover layer using a glue.

5. The sensor assembly of claim 1, wherein the second sensor apparatus comprises a proximity sensor configured to detect a position of an input object relative to the portion of the planar surface coinciding with the second region based on changes in the second capacitive sensing signals.

6. The sensor assembly of claim 1, wherein the second sensor apparatus is bonded to the second region of the cover layer using an adhesive.

7. The sensor assembly of claim 1, wherein the second sensor apparatus is coupled to the first sensor apparatus via wire bonds.

8. The sensor assembly of claim 7, wherein the wire bonds are encapsulated in a sealing material disposed between the first sensor apparatus and the second sensor apparatus.

9. The sensor assembly of claim 1, wherein an underside of the cover layer is painted a first color, and wherein the underside of the cover layer is opposite the planar surface.

10. A method of manufacturing a sensor assembly, comprising:
    molding a first material to form a cover layer having a planar surface and non-uniform thickness, wherein a thickness of the first material at a first region of the cover layer is less than a thickness of the first material surrounding the first region, and wherein the first region forms an opening, opposite the planar surface, in the cover layer;
    disposing a first sensor apparatus within the opening formed by the first region, the first sensor apparatus being bonded directly to the cover layer and configured to transmit and receive first capacitive sensing signals through a portion of the planar surface coinciding with the first region; and
    disposing a second sensor apparatus beneath a second region of the cover layer having a different thickness than the first region, the second sensor apparatus being configured to transmit and receive second capacitive sensing signals through a portion of the planar surface coinciding with the second region.

11. The method of claim 10, wherein the first material comprises plastic or polymer.

12. The method of claim 10, wherein the first sensor apparatus comprises a fingerprint sensor configured to detect a fingerprint on the portion of the planar surface coinciding with the first region based on changes in the first capacitive sensing signals.

13. The method of claim 10, wherein the first sensor apparatus is bonded directly to the cover layer using a glue.

14. The method of claim 10, wherein the second sensor apparatus is further configured to detect a position of an input object relative to the portion of the planar surface coinciding with the second region based on changes in the second capacitive sensing signals.

15. The method of claim 10, further comprising:
    bonding the second sensor apparatus to the second region of the cover layer using an adhesive.

16. The method of claim 10, further comprising:
    wire bonding the second sensor apparatus to the first sensor apparatus.

17. The method of claim 16, further comprising:
    disposing a sealing material between the first sensor apparatus and the second sensor apparatus to encapsulate the wire bonds.

18. The method of claim 10, further comprising:
    painting an underside of the cover layer a first color, wherein the underside of the cover layer is opposite the planar surface.

19. A sensor assembly comprising:
    a cover layer molded from a first material to have a planar surface and non-uniform thickness, wherein a thickness of the first material at a first region of the cover layer is less than a thickness of the first material surrounding the first region, and wherein the first region forms an opening, opposite the planar surface, in the cover layer;
    a fingerprint sensor disposed within the opening formed by the first region and bonded directly to the cover layer, the fingerprint sensor being configured to detect a fingerprint on a portion of the planar surface coinciding with the first region; and
    a proximity sensor disposed beneath a second region of the cover layer having a different thickness than the first region, the proximity sensor being configured to transmit and receive capacitive sensing signals to detect a position of an input object relative to a portion of the planar surface coinciding with the second region.

* * * * *